J. G. Page.
Cotton Picker.
No. 60,235. Patented Dec. 4, 1866.
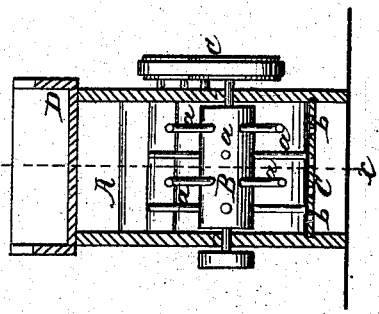
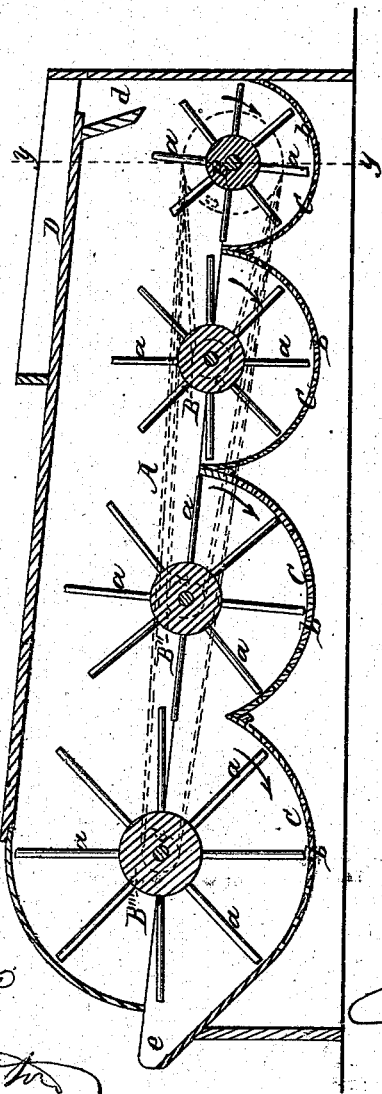
Witnesses.
Jas. A. Service
B. B. Covington
Inventor.
Jno. G. Page
Per Murry & Atty

United States Patent Office.

IMPROVEMENT IN COTTON PICKER.

JOHN G. PAGE, OF MEMPHIS, TENNESSEE.

Letters Patent No. 60,285, dated December 4, 1866.

SPECIFICATION.

TO ALL WHOM IT MAY CONCERN:

Be it known that I, JOHN G. PAGE, of Memphis, Shelby county, and State of Tennessee, have invented a new and improved Cotton Picker, or Separator; and I do hereby declare that the following is a full, clear, and exact description thereof, which will enable others skilled in the art to make and use the same, reference being had to the accompanying drawing, forming part of this specification, in which—

Figure 1 is a vertical longitudinal section of my invention, taken in the line $x\,x$, fig. 2.

Figure 2, a transverse vertical section of the same, taken in the line $y\,y$, fig. 1.

Similar letters of reference indicate like parts.

This invention relates to a new and improved device for separating dirt and foreign substances from cotton, and is more especially designed for separating such substances from long-staple cotton, and without injuring the fibre, but drawing it out, so that the gin may operate effectually upon it without cutting or breaking it. The invention consists of a series of revolving toothed or armed cylinders placed within a case or box, the bottom of which is provided with a series of perforated concaves, one underneath each cylinder. The cotton is fed into one end of the case or box, and the toothed or armed cylinders are rotated all in the same direction, and the cotton, by the action of the teeth or arms, passed or fed through the case or box, the fibre during this operation being drawn out and straightened, and the dirt and foreign substances detached, dropping by their own gravity through the perforated concaves.

A represents a case or box, which may be of any suitable dimensions, the top part being arranged so as to be capable of being lifted off to expose or render accessible, when desired, the mechanism within it. Within this case or box, A, there is fitted transversely a series of cylinders, B B' B'' B''', provided each with a series of radial teeth or arms, $a$, arranged circumferentially in rows, as shown, in fig. 2. These cylinders gradually increase in diameter from the feed to the discharge end of the case or box, B being the smallest, B' rather larger than B, and B'' rather larger than B'; the teeth or arms $a$ of the several cylinders increasing in length corresponding with the increased diameter of the cylinders. (See fig. 1.) The bottom of the case or box A is composed of a series of concaves, C, one being underneath each toothed or armed cylinder. These concaves are constructed of sheet metal, and perforated with half-inch holes, $b$, at suitable distances apart to let out the cotton seed, or admit of its discharge from the case or box. The journals at one end of the cylinders extend through the side of the case or box, and have pulleys, $c$, upon them, around which belts pass, all of the belts passing around and being driven from the pulley of the smallest cylinder B, or, if preferable or desired, motion may be communicated from one cylinder to the other by means of gearing; but whether belts or gearing are used for this purpose, the arrangement must be such as to have the cylinders increase in speed about in proportion as they increase in size. At one end of the case or box A there is a hopper D, in which the cotton to be operated upon is placed, the cotton passing from this hopper down through an opening, $d$, into the case or box A, directly over the front part of the small cylinder B. The cotton is carried around by the teeth or arms $a$ of the cylinder in the direction indicated by the arrow, the teeth or arms of one cylinder taking it from the teeth or arms of the other. By this means the cotton is carried through the case or box, and by that operation the fibre is separated, drawn out, or straightened, and the dirt and foreign substances set free or loosened, so as to drop from it and pass through the perforated concave C, the cotton being discharged from the rear of the case or box through an opening, $e$.

This invention has been practically tested, and has been found to operate well, separating the seed from the fibre without injuring the latter in the least.

Having thus described my invention, I claim as new, and desire to secure by Letters Patent—

A series of toothed or armed cylinders, B B' B'' B''', placed within a case or box A, provided with a bottom composed of a series of perforated concaves C; the cylinders gradually increasing in size from the feed to the discharge end of the case or box, and their speed of rotation increasing about in proportion to the increase of their dimensions, substantially as and for the purpose set forth.

The above specification of my invention signed by me this 17th day of April, 1866.

JOHN G. PAGE.

Witnesses:
J. W. HINCHER,
S. A. MOORE.